Patented Jan. 8, 1935

1,987,260

UNITED STATES PATENT OFFICE 1,987,260

MANUFACTURE OF GLYCERINE

Cecil Herbert Lilly, Saltcoats, Scotland, assignor to Imperial Chemical Industries Limited, a corporation of Great Britain No Drawing. Application March 18, 1931, Serial No. 523,657. In Great Britain March 18, 1930

1 Claim. (Cl. 195—20)

This invention relates to improved processes for the manufacture of glycerine by the fermentation of carbohydrates, and comprises processes whereby relatively concentrated solutions of carbohydrates may be fermented in the presence of sulphites and bisulphites, approximately neutral in reaction, with the production of glycerine in relatively high concentration.

It has been proposed to remove volatile products from alkaline fermentation liquors and to dissolve sugar in the glycerine-containing residues, which are then submitted to a further fermentation, this process being repeated as often as desired.

I have now found that the process can be applied with complete success to approximately neutral fermentation liquors by the incorporation of certain essential modifications now to be described.

According to my invention a carbohydrate solution, containing a mixture of a soluble sulphite and a soluble bisulphite in such proportions as to give a neutral or approximately neutral reaction, is fermented in the usual manner. When fermentation has proceeded as far as is desired, an amount of soda ash or other mild alkali equivalent to, or rather more than equivalent to, the amount of bisulphite originally present is added. The now alkaline solution (preferably after removal of the yeast by filtration) is boiled so that the more volatile products (acetaldehyde, alcohol, etc.) distil off. The neutrality or approximate neutrality of the residual glycerine-containing liquor is then according to my invention, restored by treatment with sulphur dioxide or agent supplying the same, e. g. sulphurous acid or a soluble bisulphite, and this liquor is used in a second fermentation with fresh carbohydrate and the same or a fresh supply of yeast. The operations may be repeated several times if desired.

I have further found that high concentrations of carbohydrate, e. g. up to 25% of sugar or more may be employed if the solution of mixed sulphites is added gradually to the fermenting sugar solution from time to time as required to maintain a sulphite concentration favourable or not injurious to the fermentation.

Thus according to my invention when adding the glycerine-containing residues and regenerated sulphite mixture to a further batch of fermenting carbohydrate solution, as also when adding the original sulphite mixture to the first batch, I prefer to make the addition in portions at intervals. I am thereby enabled to employ relatively high concentrations of carbohydrate, with consequent economies which are obvious.

In the preparation of neutral or approximately neutral mixtures of sulphites I have found by experiment that the relative proportions of sulphite to bisulphite may be ascertained by a determination of the p$^H$ value of the solution. In the case of the sodium salts, for example, the proportions corresponding with given p$^H$ values are as follows:

| p$^H$ | Parts of sodium sulphite | Parts of sodium bisulphite |
|---|---|---|
| 6.6 | 48.5 | 51.5 |
| 6.7 | 52.5 | 47.5 |
| 6.8 | 57.5 | 42.5 |
| 6.9 | 62.5 | 37.5 |
| 7.0 | 67.5 | 32.5 |

My invention is illustrated but not limited by the following example in which I describe the fermentation of molasses:

Example 300 gallons of molasses were diluted with water to a total volume of 1161 gallons containing 2240 lbs. of fermentable sugar. Pressed yeast was added in amount equal to approximately one per cent of the weight of fermentable sugar present, i. e. 22.40 lbs. and fermentation was allowed to ensue at a temperature of approximately 35° C. Meanwhile a solution of mixed sulphites had been prepared by dissolving 665 lbs. of soda ash in approximately 350 gallons of water and treating it with sulphur dioxide produced by burning sulphur. When 279 lbs. of sulphur had been burnt, the p$^H$ value of the solution was 6.7. The total sulphites present, determined by iodine titration was 1039 lbs. calculated as Na$_2$SO$_3$. At a value of p$^H$ 6.7, this corresponded with 495.8 lbs. neutral sodium sulphite and 448.6 lbs. sodium bisulphite.

When fermentation of the molasses solution had commenced the mixed sulphite solution was added in quantities of about 40 gallons at intervals of an hour, until a sulphite concentration in the fermenting solution equal to approximately 3 per cent had been reached. Thereafter the mixed sulphite solution was added in amounts sufficient to maintain this concentration of approximately 3 per cent, as estimated from time to time by volumetric determinations of the free sulphite content of the fermenting solution. In this manner the whole of the mixed sulphite solution was added to the original 1161 gallons of molasses solution. The final volume of the sulphite molasses solution when fermentation was complete at the expiration of four to five days was 1496 gallons, there being a loss of about 15 gallons due to evaporation.

The fermented liquor was allowed to settle and the insoluble matter was subsequently separated by decantation and filtration. To the decanted and filtered liquor was added 273 lbs. of soda ash, being 50 lbs. in excess of the theoretical amount required to convert the 448.6 lbs. of sodium bisulphite added to the molasses solution into sodium sulphite, but this excess is desirable owing to a slight loss of soda during the subsequent distillation process.

The fermented solution containing the soda ash was then distilled to remove acetaldehyde and alcohol. The acetaldehyde removed amounted to about 280 lbs., and the alcohol to about 427 lbs. The liquor from the still amounted to about 670 gallons and contained 575 lbs. of glycerine with a large quantity of free sodium sulphite.

This crude glycerine liquor was treated with sulphur dioxide resulting from the burning of 117 lbs. sulphur, until the pH value reached 6.7, indicating that the sodium sulphite present had been converted into a mixture of sodium sulphite and sodium bisulphite in the same proportions as existed earlier in the solution of mixed salts in water. This neutral or approximately neutral liquor containing glycerine and mixed sulphites was added in the same manner as already indicated for the solution of sulphites in water, to a further batch of fermenting molasses solution. Prior to re-utilizing this sulphite mixture, the quantity of salts was estimated by the iodine titration method and found to be equal to 1006 lbs. sodium sulphite, or, according to the pH value, 480 lbs. sodium sulphite and 434.4 lbs. sodium bisulphite, approximately the same quantities of salts as were employed for the first fermentation.

The second batch of molasses solution consisted of 290 gallons of molasses diluted with water to a total volume of approximately 1060 gallons and contained approximately 2215 lbs. of fermentable sugars. About 20 lbs. of pressed yeast was added and the temperature maintained at 30°–35° C. The glycerine-sulphite regenerated liquor was added to the fermenting molasses solution in the manner already indicated, and in five days the second fermentation was complete, the final volume being 1727 gallons.

After separation of the suspended solids from the fermented liquor, soda ash was added in amount equal to about 270 lbs. and the mixture distilled, giving 329 lbs. acetaldehyde and 468 lbs. alcohol, while the liquor from the still, amounting to about 800 gallons, contained a large quantity of free sodium sulphite (which could, if desired, be used over again after treatment with sulphur dioxide) together with 1195 lbs. glycerine.

It will be seen from the figures given above that in the first fermentation 575 lbs. of glycerine at a concentration of 0.38 lbs. per gallon were obtained by the use of 938 lbs. of soda ash and 279 lbs. of sulphur, the ratio of soda ash:sulphur:glycerine being 1.63:0.48:1.0.

In the second fermentation using glycerine residues, the glycerine totalled 1195 lbs. at a concentration of 0.69 lbs. per gallon, the total soda ash and sulphur used being 1208 lbs. and 396 lbs., respectively. The final ratio of soda ash:sulphur:glycerine thus becomes 1.01:0.33:1.0.

The adventages of the process according to my invention are thus obvious. There is a reduction in the quantity of salts used in the production of a given quantity of glycerine. The glycerine is obtained in higher concentration (thus effecting an economy in steam for evaporation) by the re-use and regeneration of the salts; this is further increased when, as in the preferred embodiment of my invention, a higher concentration of carbohydrate is used, made possible by the addition of the sulphite mixture to the fermenting liquor in portions at intervals.

As many apparently widely different embodiments of this invention may be made without departing from the spirit and scope thereof, it is to be understood that I do not limit myself to the specific embodiments thereof except as defined in the appended claim.

I claim:

In the manufacture of glycerine by the fermentation of carbohydrates in the presence of a soluble sulphite and a soluble bisulphite in such proportions as to give an approximately neutral solution, the step of adding to the fermenting mash from time to time relatively small quantities of regenerated sulphite-bisulphite solution containing glycerine from a previous fermentation of the kind described.

CECIL HERBERT LILLY.